US006022918A

United States Patent [19]

Lienert et al.

[11] Patent Number: 6,022,918

[45] Date of Patent: Feb. 8, 2000

[54] WIRE ENAMEL FORMULATION WITH INTERNAL LUBRICANT

[75] Inventors: Klaus-Wilhelm Lienert, Hamburg; Irmgart Gebert, Ahrensburg; Helmut Lehmann, Reinbek; Michael W. Müller, Biblis, all of Germany

[73] Assignee: BASF Coatings AG, Muenster-Hiltrup, Germany

[21] Appl. No.: 08/945,579

[22] PCT Filed: Apr. 25, 1996

[86] PCT No.: PCT/EP96/01723

§ 371 Date: Jan. 13, 1998

§ 102(e) Date: Jan. 13, 1998

[87] PCT Pub. No.: WO96/34399

PCT Pub. Date: Oct. 31, 1996

[30] Foreign Application Priority Data

Apr. 26, 1995 [DE] Germany ........................... 195 15 263

[51] Int. Cl.[7] ............................... C08J 5/10; C08L 91/06

[52] U.S. Cl. ............................ 524/275; 106/10; 524/276; 524/277; 524/310; 524/313; 524/378

[58] Field of Search .............................. 106/10; 524/275, 524/276, 277, 310, 313, 318

[56] References Cited

U.S. PATENT DOCUMENTS

| | | | |
|---|---|---|---|
| 4,146,499 | 3/1979 | Rosano | 252/186 |
| 4,450,258 | 5/1984 | Pauze | 525/440 |
| 5,746,812 | 5/1998 | Muller et al. | 106/10 |

FOREIGN PATENT DOCUMENTS

| | | | |
|---|---|---|---|
| 0103 307 A2 | 9/1983 | European Pat. Off. | H01B 3/30 |
| 0267 736 A2 | 11/1987 | European Pat. Off. | H01B 50/44 |
| 3237022 A1 | 10/1982 | Germany | H01H 3/30 |

*Primary Examiner*—James J. Seidleck
*Assistant Examiner*—U. K. Rajguru

[57] ABSTRACT

The present invention relates to a wire enamel formulation comprising components which are known per se and an internal lubricant consisting of a polyethylene wax, preferably having a molecular mass of from 3000 to 6000 g/mol, and a wetting agent, preferably fatty alcohol ethoxylate.

13 Claims, No Drawings

WIRE ENAMEL FORMULATION WITH INTERNAL LUBRICANT

The present invention relates to a wire enamel formulation obtaining components known per se with an internal lubricant.

Enamelled copper wires are coated with a lubricant in order to improve their processing properties. Conventional lubricants consist of a 0.5 to 2% strength solution of paraffins or waxes in a readily volatile solvent. On application to the wire, the solvent evaporates to leave the paraffin or was film. A disadvantage of this procedure is that the solvents customarily used may give rise to cracks in the surface of the enamel film.

These and other disadvantages disappear if internal lubricants are used. Such lubricants are added to the enamelling material. After the wire enamel has cured, they are incompatible with it. They migrate to the surface where they form a layer which possesses improved lubricity.

The problem is that many of these internal lubricants are incompatible with the liquid enamelling material and lead to phase separation or instances of precipitation.

DE 32 37 022A describes a lubricant comprising an aliphatic hydrocarbon mixture as solvent and 1% paraffin wax and also 1% hydrogenated triglyceride. The paraffin wax has a melting point of 50–52° C. The hydrogenated triglyceride is a commercial product with a melting point of from 47° C. to 50° C. this solution is applied to a wire coated with a polyamideimide. In addition, it is also possible for an internal lubricant to be used. The latter is added to the polyamideimide in a concentration of 1%. The internal lubricant consists of tall oil fatty acid esters. No information is given on the coefficients of friction which are achieved.

EP 00 72 178A describes the modification of wire enamel binders, in the course of which a C21 hydrocarbon chain is incorporated into the polymer. This chain leads to an improved coefficient of friction in the enamelled wires. The document gives no information on the thermal properties. It is suspected that the softening of the enamel film and the dielectric loss factor are adversely affected by the introduction of the hydrocarbon chain.

EP 0 103 307A describes conventionally applied lubricants which, on the wires in relays, show a reduced gas-escape tendency. This is achieved by the substitution of the terminal hydrogen in a polypropylene glycol by an organic radical.

EP 0 267 736 describes comparisons between paraffinic and polymeric lubricants. In the relay reliability test, the polymeric lubricants perform considerably better. No information is given on the stability of the processed polymer/wire enamel mixtures.

Another document (JP 0 524 7374A) describes how the use of dispersions of fluorinated waxes in conventional wire enamels leads to an improvement in the lubricity of the wires produced therewith. Such systems have a tendency, however, to undergo phase separation.

JP 0 521 7427A describes the use of a polyethylene wax dispersion in a polyamideimide wire enamel. Experience indicates that these systems are not stable on storage.

From the examples given it is evident that an optimum lubricant must be an internal lubricant. Moreover, the lubricity-improving additive should be a polymeric material, and the formulation should be stable on storage.

The object of the present invention, accordingly, was to provide a wire enamel formulation obtaining components known per se and an internal lubricant, which formulation meets the requirements set cut above.

This object is surprisingly achieved in that the internal lubricant obtains a polyethylene wax, preferably having a molecular means [$M_W$] of from 3000 to 6000 [g/mol], and a wetting agent, preferably fatty alcohol ethoxylate.

In accordance with the invention it is possible to use wire enamels containing a polyesterimide as binder. Such polyesterimide resins are known and are described, for example, in DE-A 14 45 263 and DE-A 14 95 100.

The polyesterimides are prepared in a known manner by esterification of polybasic carboxylic acids with polyhydric alcohols, with or without the addition of hydroxycarboxylic acids, and using starting materials which contain imido groups. In place of the free acids and/or alcohols it is also possible to employ their reactive derivatives. As the carboxylic acid component it is preferred to employ terephthalic acid, while polyhydric alcohols which are employed with preference are ethylene glycol, glycerol and tris(2-hydroxyethyl) isocyanurate (THEIC), the latter being particularly preferred. The use of tris(2-hydroxyethyl) isocyanurate leads to an increase in the softening temperature of the enamel film obtained.

The imido-containing starting materials can be obtained, for example, by reaction between compounds of which one is required to possess a five-membered, cyclic carboxylic anhydride group and at least one further functional group, while the other contains, in addition to a primary amino group, at least one further functional group. These further functional groups are, in particular, carboxyl groups or hydroxyl groups, but may alternatively be further primary amino groups or carboxylic anhydride groups.

Examples of compounds having a cyclic carboxylic anhydride group with a further functional group are, in particular, pyromellitic dianhydride and trimellitic anhydride. However, other aromatic carboxylic anhydrides are also suitable, for example the naphthalenetetra-carboxylic carboxylic dianhydrides, or dianhydrides of tetra-carboxylic acids with two benzene rings in the molecule, in which the carboxyl groups are in positions 3, 3', 4 and 4'.

Examples of compounds having a primary amino group and a further functional group are, in particular, diprimary diamines, for example ethylenediamine, tetramethylenediamine, hexamethylenediamine, nonamethylenediamine and other aliphatic diprimary diamines. Also suitable are aromatic diprimary diamines, such as benzidine, diaminodiphenylmethane, diaminodiphenyl ketone, sulphone, sulphoxide, either and thioether, phenylenediamines, tolylenediamines, xylylenediamines, and also diamines with three benzene rings in the molecule, such as α, α'-bis(4-aminophenyl)-p-xylene or 1,4-bis(4-aminophenoxy)benzene, and finally cycloaliphatic diamines, such as 4,4'-dicyclohexylmethanediamine. Other amino-containing compounds with a further functional group which can be used are amino alcohols, for example monoethanolamine or monopropanolamines, and also aminocarboxylic acids, such as glycine, aminopropionic acids, aminocaproic acids or aminobenzoic acids.

The polyesterimide resins are prepared using known transesterification catalysts, for example heavy metal salts, such as lead acetate and zinc acetate, and also organotitanates, cerium compounds, and organic acids, for example para-toluenesulphonic acid. As cross-linking catalysts in the curing of the polyesterimides it is possible to use the same transesterification catalysts, expediently in a proportion of up to 3% by weight based on the binder.

Solvents appropriate for the preparation of the polyesterimide wire enamels are cresolic and non-cresolic organic solvents, for example cresol, phenol, glycol ethers, for example methylglycol, ethylglycol, isopropylglycol, butylglycol, methyldiglycol, ethyldiglycol and butyldiglycol; glycol ether esters, for example methylglycol acetate, ethylglycol acetate, butylglycol acetate and 3-methoxy-n-butyl acetate; cyclic carbonates, for example propylene carbonate; cyclic esters, such as γ-butyrolactone and, for example, dimethylformamide and N-methylpyrrolidone. Furthermore, it is also possible to employ aromatic solvents, in combination if desired with the abovementioned solvents. Examples of such solvents are xylene, Solventnaphtha, toluene, ethylbenzene, cumene, heavy benzene, various Solvesso® and Shellsol® grades, and Dessol®.

In accordance with the invention it is also possible to use wire enamels containing a polyamideimide as binder. The use of such polyamideimides in wire enamels is known and is described, for example, in U.S. Pat. No. 3,554,984, DE-A-24 41 020, DE-A-25 56 523DE-A-12 66 427 and DE-A-19 56 512.

The polyamideimides are prepared in a known manner from polycarboxylic acids or their anhydrides in which two carboxyl groups are in a vicinal position and in which there must be at least one further functional group, and from polyamines having at least one primary amino group which is capable of forming an imide ring, or from compounds having at least 2 isocyanate groups. The polyamideimides can also be obtained by reacting polyamides, polyisocyanates which contain at least 2 NCO groups, and cyclic dicarboxylic anhydrides which contain at least one further group which can be subjected to reaction by condensation or addition.

Furthermore, it is also possible to prepare the polyamideimides from diisocyanates or diamines and dicarboxylic acids, provided one of the components already contains the imide group. For instance, it is possible in particular first to react a tricarboxylic anhydride with a diprimary diamine to give the corresponding diimidocarboxylic acid, which is then reacted with a diisocyanate to form the polyamideimide.

For the preparation of the polyamideimides, preference is given to the use of tricarboxylic acids or anhydrides thereof in which 2 carboxyl groups are in a vicinal position. Preference is given to the corresponding aromatic tricarboxylic anhydrides, for example trimellitic anhydride, naphthalenetricarboxylic anhydrides, bisphenyltricarboxylic anhydrides, and other tricarboxylic acids having 2 benzene rings in the molecule and 2 vicinal carboxyl groups, such as the examples given in DE-A 19 56 512. Very particular preference is given to the employment of trimellitic anhydride. As amine component it is possible to employ the diprimary diamines already described in connection with the polyamidocarboxylic acids. The possibility also exists, furthermore, of employing aromatic diamines containing a thiadiazole ring, for example 2,5-bis(4-aminophenyl)-1,3,4-thiadiazole, 2,5- bis(3-aminophenyl)-3,3,4-thiadiazole, 2-(4-aminophenyl)-5-(3-aminophenyl)-1,3,4-thiadiazole, and also mixtures of the various isomers.

Diisocyanates suitable for the preparation of the polyamideimides are aliphatic diisocyanates, such as tetramethylene, hexamethylene, heptamethylene and trimethylhexamethylene diisocyanates; cycloaliphatic diisocyanates, for example isophorone diisocyanate, ω,ω'-diisocyanato-1,4-dimethylcyclohexane, cyclohexane 1,3-diisocyanate, cyclohexane 1,4-diisocyanate, 1-methylcyclohexane 2,4-diisocyanate and dicyclohexylmethane 4,4'-diisocyanate; aromatic diisocyanates, for example phenylene, tolylene, naphthylene and xylylene diisocyanates, and also substituted aromatic systems, for example diphenyl ether, diphenyl sulphide, diphenyl sulphone and diphenylmethane diisocyanates; mixed aromatic-aliphatic and aromatic-hydroaromatic diisocyanates, for example 4-isocyanatomethylphenyl isocyanate, tetrahydronaphthylene 1,5-diisocyanate and hexahydrobenzidine 4,4'-diisocyanate. Preference is given to the use of 4,4'-diphenylmehtane diisocyanate, 2,4- and -2,6-tolylene diisocyanate and hexamethylene diisocyanate.

Suitable polyamides are those polyamides which have been obtained by polycondensation of dicarboxylic acids or derivatives thereof with diamines or of aminocarboxylic acids and their derivatives, such as lactams.

The following polyamides can be mentioned by way of example: dimethylenesuccinamide, pentamethylenepimelamide, amide, undecanemethylenetridecanedicarboxamide, hexamethyleneadipamide and polycaproamide. Particular preference is given to hexamethyleneadipamide and polycaproamide.

As crosslinking catalysts in the wire enamels in connection with the curing of the polyamideimides, it is possible to employ suitable heavy metal salts, for example zinc octoate, cadmium octoate, tetraisopropyl titanate or tetrabutyl titanats, in a quantity of up to 3% by weight, based on the binder.

In accordance with the invention the internal lubricant is preferably composed of from 0.1 to 4.5% by weight of polyethylene wax and from 0.1 to 2.0% by weight of wetting agent. Very particularly preferred figures are from 1.0 to 2.0% by weight of polyethylene wax and from 0.2 to 1.2% by weight of wetting agent. The quantities indicated are based in each case on the amount of binder in the wire enamel.

The polyethylene waxes which can be employed in accordance with the invention are commercially obtainable under the name Luwax®. These polyethylene waxes are distinguished by a narrow molecular mass distribution. Furthermore, they enable the controlled establishment of high hardness and high crystallinity.

If a polyethylene wax dispersion, for example Luwax® in xylene, is poured into an N-methylpyrrolidone-containing solution of the above-described binders, phase separation takes place. If, on the other hand, wetting agent is added, then phase separation can be suppressed to varying degress.

In accordance with the invention, therefore, wetting agents are added to the wire enamel formulation. The wetting agents advantageously employed are, in particular, fatty alcohol ethoxylates. Emulan® AF, a product of BASF AG, is particularly suitable for stabilizing the polyethylene waxes described in a wire enamel. Wetting agents which have been fully tested and found suitable also include the BASF products Emulen® EL, Emulan® PO and Pluronic® 8100.

The present invention also relates to a process for the preparation of the described wire enamel formulation. In this process, solvent is first of all added to a polyethylene wax having a molecular mass of preferably from 3000 to 6000 [g/mol]. It is preferred to add from 5 to 25% by weight of solvent, based on the polyethylene wax. A proportion of solvent of from 8 to 11% by weight is particularly preferred. Very particular preference attaches to a figure of 10% by weight. Solvents which can be employed in particular are aromatic fractions. Xylene and toluene are preferred above all.

In a further step, polyethylene wax and solvent are heated, preferably at 70 to 100° C. A temperature of around 80° C. is very particularly preferred. After the polyethylene wax has dissolved completely, the solution is cooled to room temperature again.

A wetting agent, preferably fatty alcohol ethoxylate, is then added.

The proportions are chosen such that, preferably, from 0.1 to 4.5% by weight of polyethylene wax and from 0.1 to 2.0% by weight of wetting agent are employed, based in each case on the amount of binder in the wire enamel. These figures are, with very particular preference, from 1.0 to 2.2% by weight of polyethylene wax and from 0.2 to 1.2% by weight of wetting agent.

Finally, the dispersion thus obtained is added to the wire enamel obtaining components known per se. Particularly suitable wire enamels in this context are those whose binders comprise the above-described polyesterimides or polyesteramideimides.

The wire enamels according to the invention, prepared in this way, find application in particular in the coating of electrical conductors.

In the text below, the invention is described in more detail with reference to examples.

EXAMPLES

Example 1

Preparation of a Polyesterimide Wire Enamel

A polyesterimide is prepared by reacting 3.9 parts of ethylene glycol, 8.7 parts of dimethyl terephthalate, 10.2 parts of tris(2-hydroxyethyl) isocyanurate, 11.5 parts of trimellitic anhydride and 5.9 parts of 4,4'-diaminodiphenylmethane in the presence of 0.04 part of tetra-n-butyl titanate. This polyesterimide is dissolved in 56 parts of a mixture of aresol/Solventnaphtha° in a ration of 2:1, and 0.7%, based on the overall formulation, of a commercial titanium catalyst is added. The wire enamel obtained in this way has a viscosity of 800 mPas (23° C.) and a solids content of 39% (1 g/lh/180° C.).

Example 2

Preparation of a Polyamideimide Wire Enamel

A polyamideimide is prepared by the method described in DE-B 12 66 427 from 38.5 parts of trimellitic acid and 60.0 parts of diphenylmethane diisocyanate. The wire enamel is a 25% strength solution of this polyamideimide in a mixture of 65 parts of N-methylpyrrolidone and 35 parts of xylene. This wire enamel has a viscosity of 230 mPas at 23° C.

Example 3

Preparation of a Luwax® AH6 dispersion in Xylene 900 g of xylene and 100 g of Luwax® AH6 are heated at 80° C. After the was has dissolved, the solution is cooled. 20 g of Emulan® AF are added to the cooled dispersion.

Example 4

Preparation of a Luwax® A dispersion in xylene 900 g of xylene and 100 g of Luwax® A are heated at 80° C. After the wax has dissolved, the solution is cooled. 20 g of Emulan AF are added to the cooled dispersion.

Example 5

Preparation of a Polyesterimide Wire Enamel with Internal Lubricant 50 g of the dispersion from Example 3 are added to 1000 g of the wire enamel from Example 1. The enamelling material prepared in this way is applied.

| Enamelling conditions | One-coat enamelling |
|---|---|
| Oven: | MAG AW/1A |
| Temperature: | 520° C. |
| Application system: | nozzles |
| Wire diameter: | 0.71 mm |
| Take-off speed: | 30 m/min |
| Number of passes: | 10 |
| Degree of increase: | 2L |

Example 6

Preparation of a Polyamideimide Wire Enamel with Internal Lubricant 50 g of the dispersion from Example 4 are added to 1000 g of the wire enamel from Example 2. The enamelling material prepared in this way is applied as a cover enamel over a commercial THEIC polyester base enamel.

| Enamelling conditions | Two-coat enamelling |
|---|---|
| Oven: | MAG AW/1A |
| Temperature: | 520° C. |
| Application system: | nozzles |
| Wire diameter: | 0.71 mm |
| Take-off speed: | 30 m/min |
| Number of passes: | |
| Base enamel | 8 |
| Cover enamel | 2 |
| Degree of increase: | 2L |

The wires from Example 5 and 6 were each subjected to the following procedure: from a section of wire about 750 mm long a twist was prepared as described in IEC 851-5/4.3. A 240 mm section was cut from the twist. This section has 10 windings. The opposite ends of the wires from the twist are clamped into a Lloyd M30K tearing machine. The force, in newtons, required to tear the twist apart at a speed of 200 m/min is measured.

For each enamel, five twists were twists were produced and tested. At the same time, the testing was also carried out of five twists of a wire coated with a conventional paraffinic lubricant.

For a standard wire, a mean force of 2.5 newtons was measured. The figure found for the wire from Example 5 was 1.5 newtons and that for the wire from Example 6 was 1.9 newtons.

We claim:

1. A wire enamel formulation comprising a binder, at least one internal lubricant comprising a polyethylene wax having a molecular mass of from 3000 to 6000, and a wetting agent comprising a fatty alcohol ethoxylate.

2. The wire enamel formulation of claim 1, wherein the lubricant comprises from 0.1 to 4.5% by weight of polyethylene wax and from 0.1 to 2.0% by weight of wetting agent, the percentages by weight being based on the amount of binder in the wire enamel.

3. The wire enamel formulation of claim 1 further comprising a binder comprising a polyesterimide or polyamideimide.

4. A process for the preparation of the wire enamel formulation of claim 1, the process comprising:

a) providing a polyethylene wax having a molecular mass of 3000 to 6000, b) adding from 5 to 25% by weight of a solvent to the polyethylene wax to form a mixture, the percent by weight being based on the weight of the polyethylene wax, c) heating the mixture to a temperature sufficient to dissolve the polyethylene wax to form a solution, d) cooling the solution, e) adding a wetting agent comprising a fatty alcohol ethoxylate to the cooled solution to form a dispersion, and f) adding the dispersion to a wire enamel comprising a binder so as to produce the wire enamel formulation of claim 1.

5. The process according to claim 4, further comprising adding from 8 to 11% by weight of solvent to the polyethylene wax.

6. The process of claim 4 wherein the solvent is selected from the group consisting of xylene or toluene.

7. The process of claim 4 wherein heating the mixture to a temperature sufficient to dissolve the polyethylene wax to form a solution comprises heating the mixture to a temperature of between 70 to 100° C.

8. The process of claim 4 wherein the dispersion comprises from 0.1 to 4.5% by weight of polyethylene wax and from 0.1 to 2.0% by weight of wetting agent, based in each case on the amount of binder in the wire enamel.

9. The process of claim 4 further comprising adding the dispersion to the wire enamel comprising a binder selected from the group consisting of a polyesterimide or a polyamideimide.

10. A process for coating electrical conductors with a wire enamel, the process comprising providing an electrical conductor, coating the electrical conductor with a wire enamel formulation obtained by the process of claim 4.

11. The wire enamel formulation of claim 2, wherein the at least one internal lubricant comprises from 1.0 to 2.2% by weight of polyethylene wax and from 0.2 to 1.2% by weight of wetting agent.

12. The process of claim 7 comprising heating the mixture to a temperature of about 80 degrees C.

13. The process of claim 8 wherein the dispersion comprises from 1.0 to 2.2% by weight of polyethylene wax and from 0.1 to 2.0% by weight of wettting agent, based on the amount of binder in the wire enamel.

* * * * *